(12) United States Patent
Palmquist (10) Patent No.: US 7,066,103 B2
(45) Date of Patent: Jun. 27, 2006

(54) ANCHORING DEVICE

(75) Inventor: Bjorn Palmquist, Göteborg (SE)

(73) Assignee: Moorlink AB, Gothenburg (SE)

( * ) Notice: Subject to any disclaimer, the term of this patent is extended or adjusted under 35 U.S.C. 154(b) by 0 days.

(21) Appl. No.: 11/114,810

(22) Filed: Apr. 26, 2005

(65) Prior Publication Data

US 2006/0086303 A1   Apr. 27, 2006

(30) Foreign Application Priority Data

Oct. 22, 2004   (SE) .................................. 0402552

(51) Int. Cl.
*B63B 21/24* (2006.01)
(52) U.S. Cl. .................................. 114/230.2
(58) Field of Classification Search ............. 114/230.2, 114/293
See application file for complete search history.

(56) References Cited

U.S. PATENT DOCUMENTS 4,630,522 A * 12/1986 Palmer et al. ............... 89/1.14
5,002,504 A * 3/1991 Carlson ....................... 439/599
5,293,831 A * 3/1994 Whitehead ............. 114/230.24
6,840,824 B1 * 1/2005 Harada et al. .............. 439/857

* cited by examiner

Primary Examiner—Stephen Avila
(74) Attorney, Agent, or Firm—Gauthier & Connors LLP (57) ABSTRACT

The present invention relates to a mooring line connector system for connecting and disconnecting lines, comprising:
 a female connector body (1) defining an internal receptacle and defining spaced male connector body (21) surfaces defining an axially male connector receiving opening (13);
 the female connector (1) having at least three substantially cylindrical subparts (5, 7) being integral with said connector body (1) and a line connecting end (2);
 a male connector body (21) having at least three substantially cylindrical subparts (25, 26, 29) and a line connecting end (22);
 the female connector subparts (5, 7) being in substantial conformity with the male connector body subparts (25, 26, 29);
 the male connector body (21) being rotatable in relation to the female connector body (1) to bring shoulders (14, 28) present on each female and male body in contact, or out of contact, respectively, with each other.

4 Claims, 9 Drawing Sheets

FIG. 1a    FIG. 1b

STEP 0

FIG. 2

STEP 1

FIG. 3

STEP 2

FIG. 4

STEP 3

FIG. 5

STEP 4

FIG. 6

STEP 5

FIG. 7

STEP 6

FIG. 8

STEP 7

FIG. 9

ANCHORING DEVICE

TECHNICAL FIELD

This invention relates generally to connecting devices for connecting a mooring line, also called wire rope, to other objects. More particularly, this invention concerns a mooring line connector mechanism which facilitates remotely controlled connection and reconnection of mooring lines to objects, including other wire lines, and enables users to make mooring line connections and disconnections in remote or hostile environments without necessitating the presence of personnel at the site where mooring line connections and disconnections must occur. Even more specifically, the present invention concerns an open throated, basket type mooring line connector having enhanced load resisting characteristics due to the contoured design of load resisting components and which incorporates a connector and connector receptacle configuration that minimizes the potential for spreading or splitting of the connector body structure thereof when loads of high magnitude are applied thereto.

BACKGROUND OF THE INVENTION

When a mooring line or wire rope is connected to an object, connected to another length of wire rope or connected to a load carrying chain a connector device of some sort is required. Typically a mooring line connector, especially a connector that is releasable, requires an interlocking connector mechanism having a latch to prevent inadvertent separation of the connector components. Simple but efficient mooring line connectors are often provided with removable connector pins or bolts which are used to secure connector components in assembly and yet provide for ease of connector release or separation when it becomes desirable to release a mooring line from an object. One representative example of a mooring line connector is set forth in U.S. Pat. No. 4,642,854 of Kelly et al, which is a mooring socket connector having a body structure and utilizing a cadmium or polymer material to permanently couple a mooring line to the connector body. A releasable mooring line connector which incorporates a connector bolt for connecting and releasing the connector mechanism is shown in FIG. 10 of U.S. Pat. No. 4,067,282 of Guinn et al.

A further mooring line connector is known from U.S. Pat. No. 6,158,093 of Bergeron, assigned to Delmar Systems Inc. being defined as a socket connector mechanism for connecting and disconnecting lines, comprising:

(a) a socket connector body defining an internal socket receptacle and defining spaced connector body surfaces defining a laterally opening line access slot;

(b) a bail being integral with said socket connector body and having a pair of support arms being interconnected at the upper ends thereof, said bail being oriented with respect to said socket connector body such that when said socket connector body is supported by said bail said line access slot being oriented for lateral ingress and egress of a line to and from said internal socket receptacle; and (c) a generally annular reverse tapered force transmitting seat shoulder being defined by said socket connector body within said socket receptacle;

(d) a socket being fixed to a line and having a corresponding reverse angled generally annular force transmitting tapered seat surface for mating seating engagement with said generally annular reverse tapered force transmitting seat shoulder within said internal socket receptacle.

In situations where a mooring line connector of an object is remotely located, such as being located within a vertical shaft or in a subsea environment for example, it is desirable to provide a mooring line connector mechanism having the capability for both assembly and disassembly by controlled movement of one or more connector components to thus ensure that connection and release of a mooring line connector can be made without the need for personnel to be present at the connection site. When mooring line connection and release activities are desired for use in inaccessible locations it is desirable that a releasable or quick release type mooring line connector be provided having a simple and unique design that permits connection and release to be accomplished simply by movement of the mooring line or the object to which the mooring line it connected. The mooring line connector must also be of a character that a remotely controlled device such as a robot or remotely operated vehicle of appropriate type can achieve the simple movement of a mooring line relative to a mooring line connector such that connection and release can be easily accomplished even under adverse conditions.

SUMMARY OF THE INVENTION

It is a principal feature of the present invention to provide a novel mooring line connector mechanism having the capability for simple and efficient connection and release of a mooring line or a mooring line from an object which may be a fixed or movable object or may be another section of a mooring line.

It is another feature of the present invention to provide a novel mooring line connector mechanism which is of contoured design in regions of load bearing contact thereof to thus enhance the load carrying or resisting capability of the connector.

It is also a feature of the present invention to provide a novel mooring line connector system and method for using the same which enables connection and disconnection of mooring lines and other such force transmitting and restraining devices without any requirement for mechanical devices or tools.

It is another feature of the present invention to provide a novel mooring line connector system and method for using the same which enables connection and disconnection of mooring lines and other such force transmitting and restraining devices by means of controlled movement of connector components thereof.

It is an even further feature of the present invention to provide a novel mooring line connector system and method for using the same which enables connection and disconnection of mooring lines and other such force transmitting and restraining devices by means of robots, remote operating vehicles and the like when the mooring line connector is inaccessible by personnel.

Briefly, the various objects and features of the present invention are realized by providing a mooring line connector system having an open bayonet type female body structure that incorporates a male bayonet structure, which female structure has a load supporting connection at the lower portion thereof for connection to a mooring line system with a lifting device in the form of a chain, mooring line, lifting hook or the like and which male structure has a load supporting connection at the upper portion thereof for connection to a second mooring line system. The female body structure defines an internal bayonet receptacle for receiving a male bayonet structure that is affixed to a mooring line to which force, such as a lifting force, is to be applied. The female body structure also defines an axially opening through which the male structure bearing mooring line moves to gain access with the female body structure and is structured to permit substantial linear movement of the male structure into the female structure receptacle as a connection is being made and as release is carried out from the female body structure.

Other and further features of the present invention will become obvious upon an understanding of the preferred embodiment of the invention which is described in detail herein and the method by which the mooring line connector system of this invention is utilized for mooring line connection and disconnection, for recovery of mooring lines and for remotely controlled connection and release activities.

BRIEF DESCRIPTION OF THE DRAWINGS

The present invention will be described more in detail in the following by showing various objects and advantages of this invention which will become apparent to those skilled in the art. The description is made with reference to the accompanying drawing, wherein:

FIG. 1a is a front view of a mooring line connector system that is constructed in accordance with the present invention and represents a preferred embodiment of the invention to thus permit quick and efficient connection and release of a mooring line from an object;

FIG. 1b is side view of the embodiment of FIG. 1a.

DETAILED DESCRIPTION OF PREFERRED EMBODIMENTS

Figures 1A, 1B:
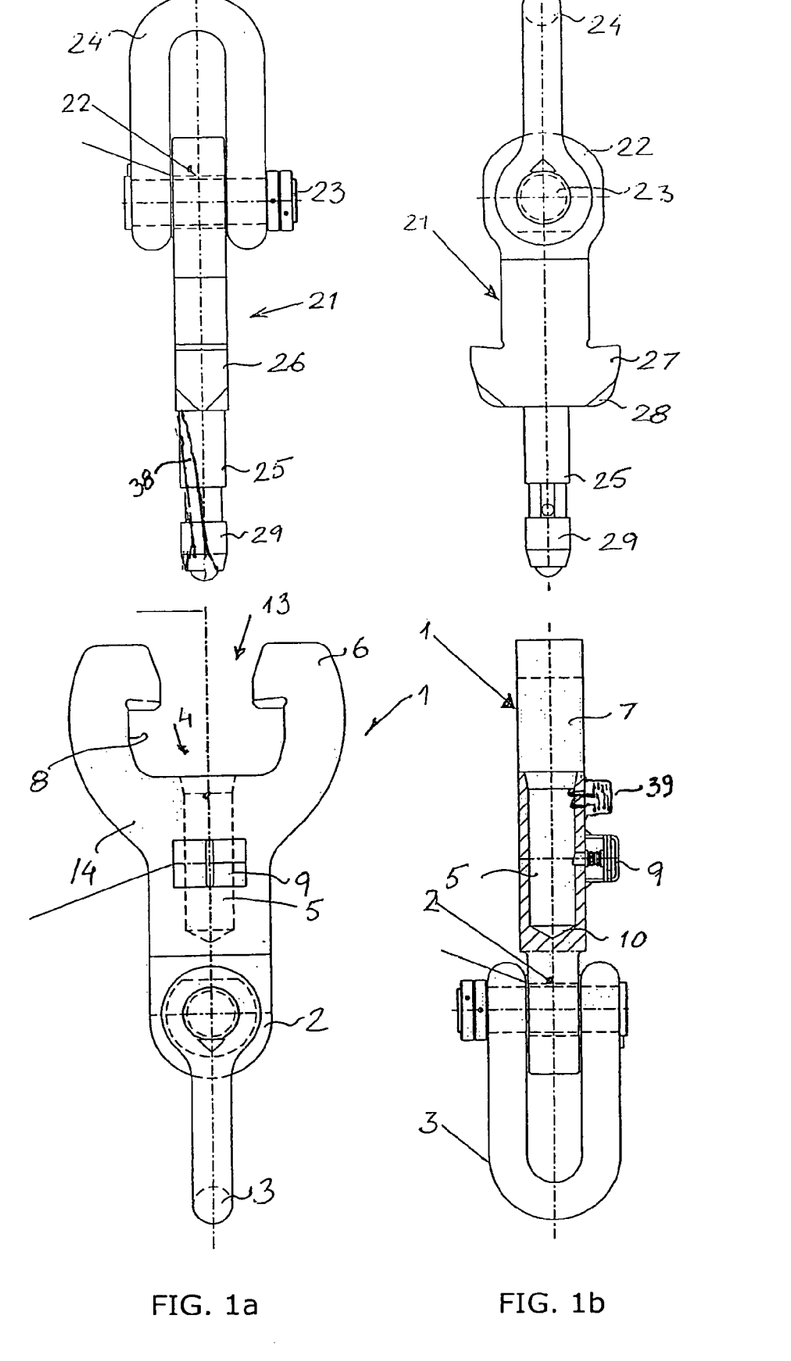
Figure 2:
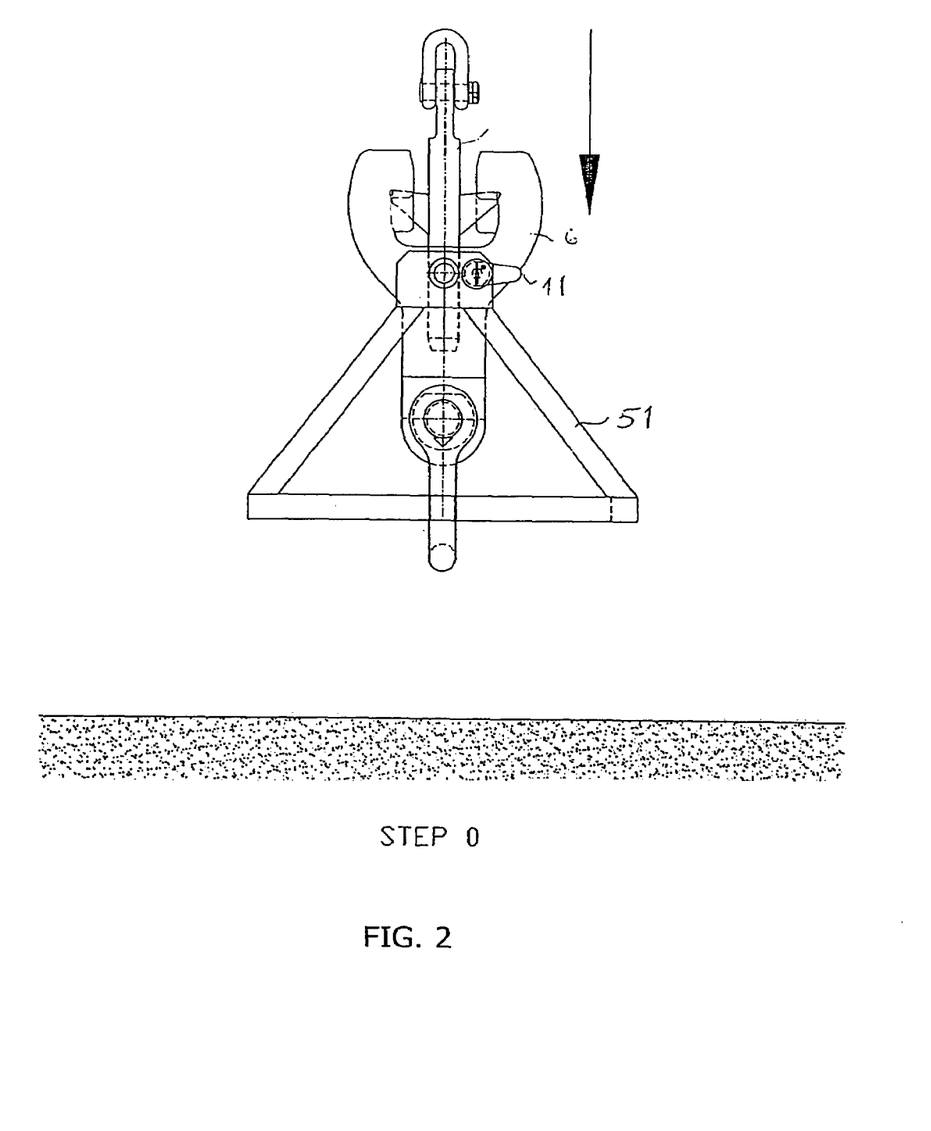
FIGS. 2–9 show in a series of views the different steps of connecting a mooring line to a connector.
Figure 3:
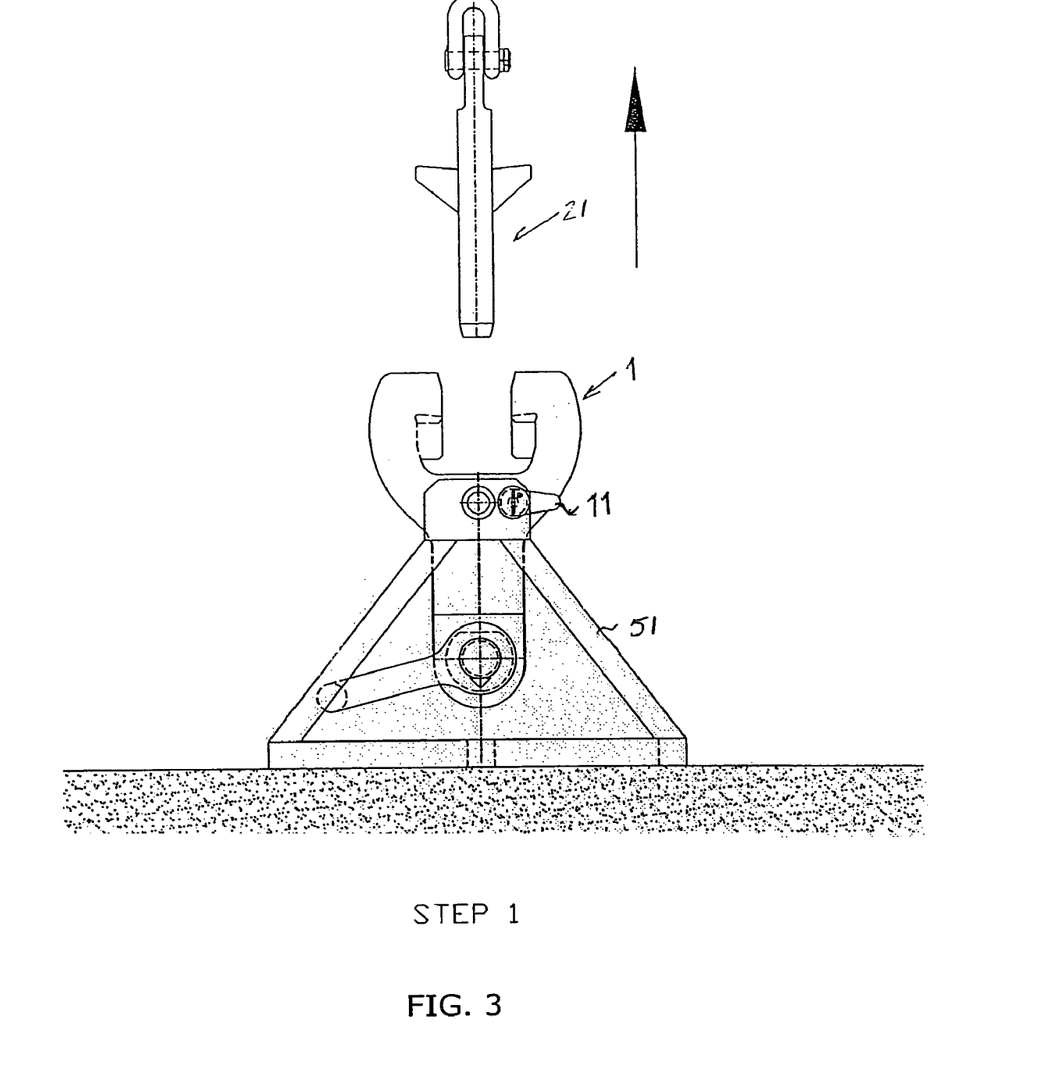
Figure 4:
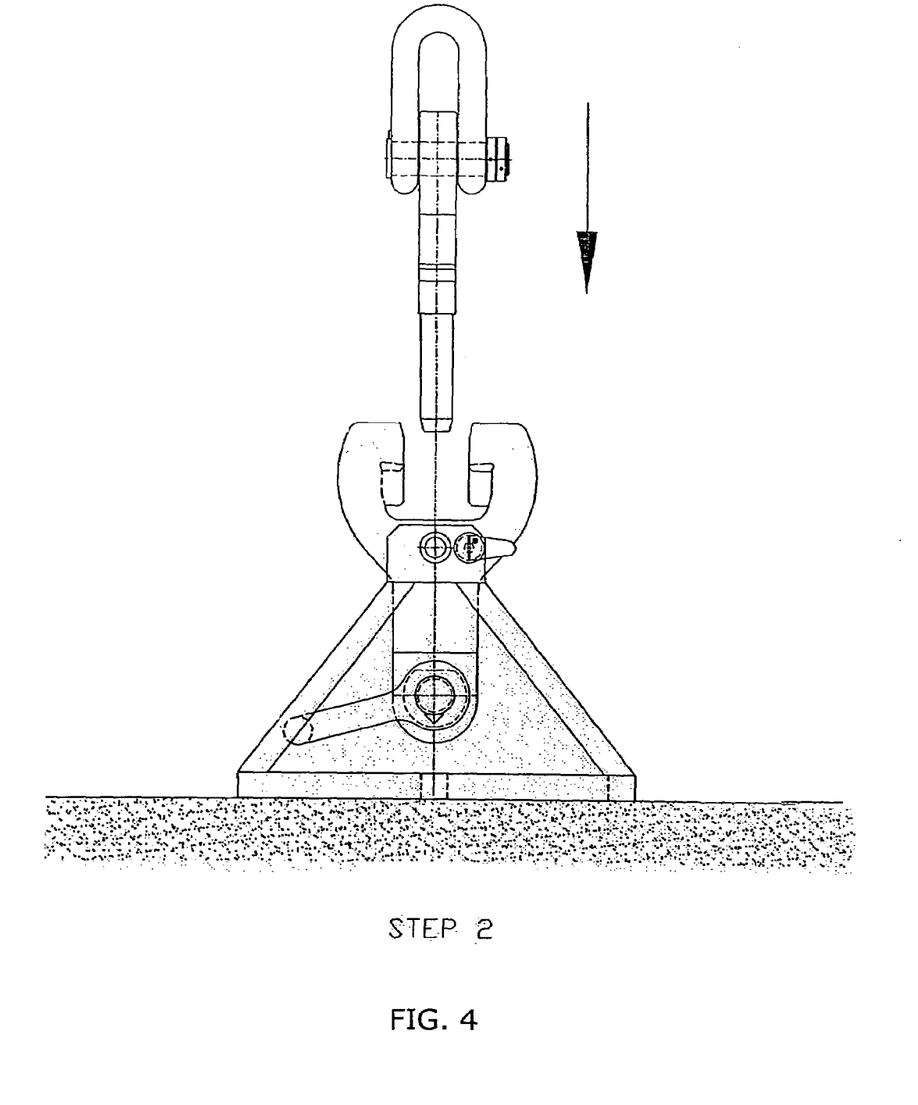
Figure 5:
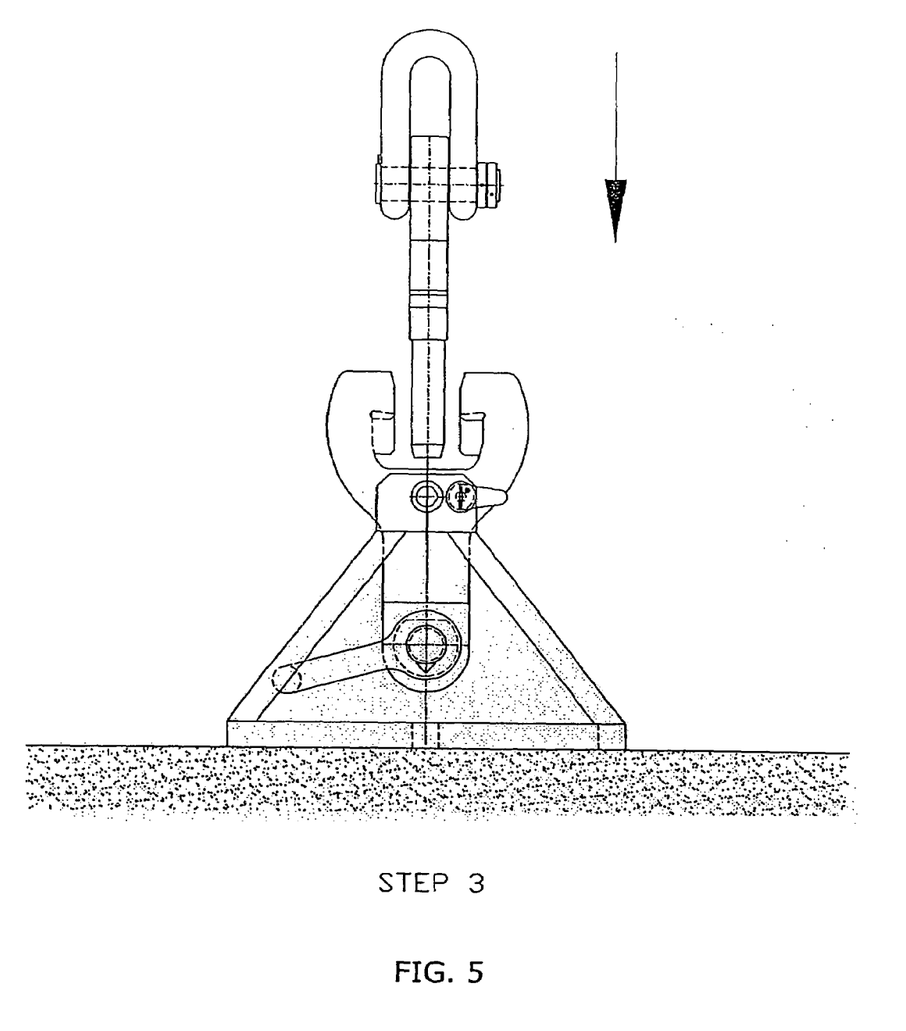
Figure 6:
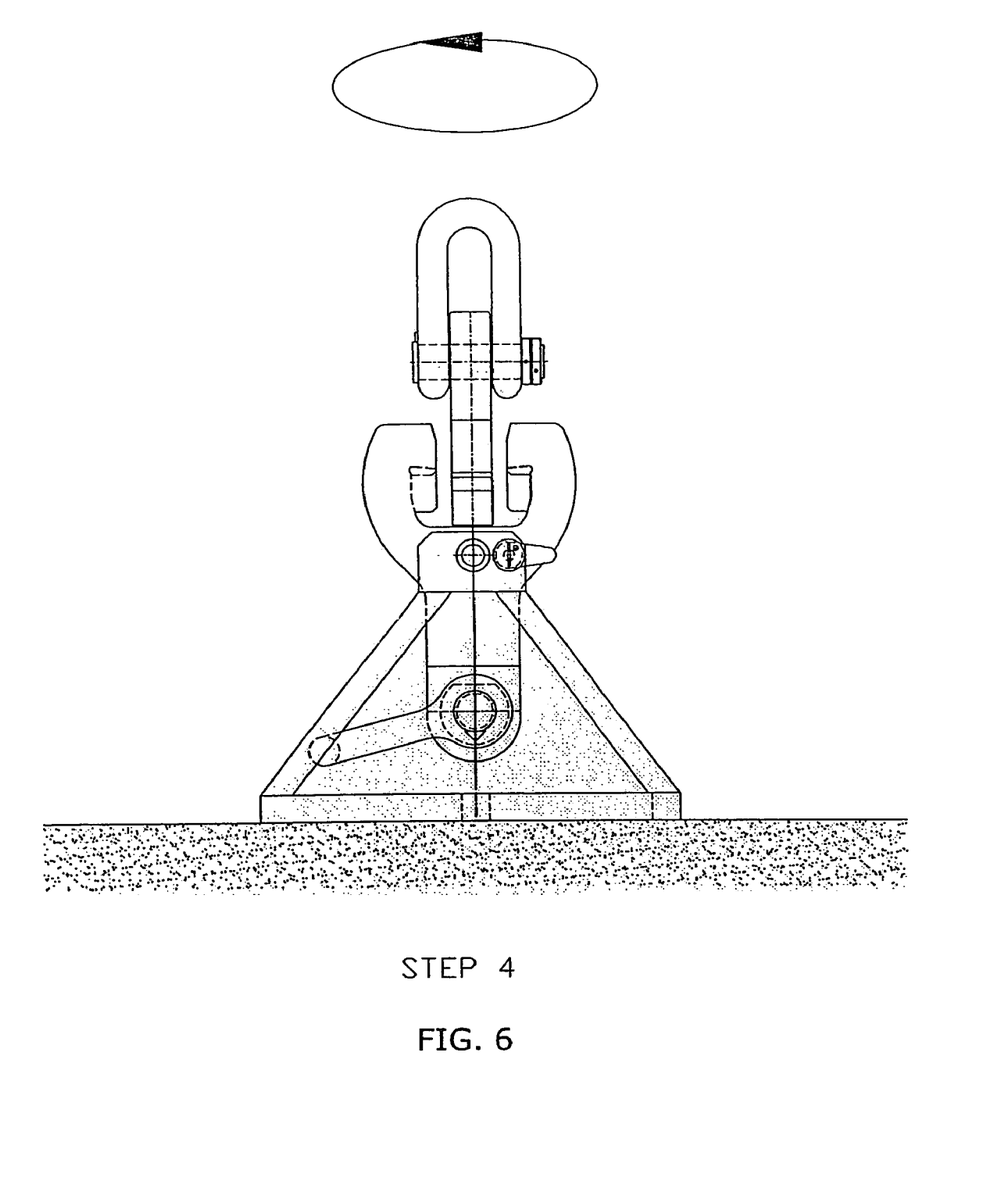
Figure 7:
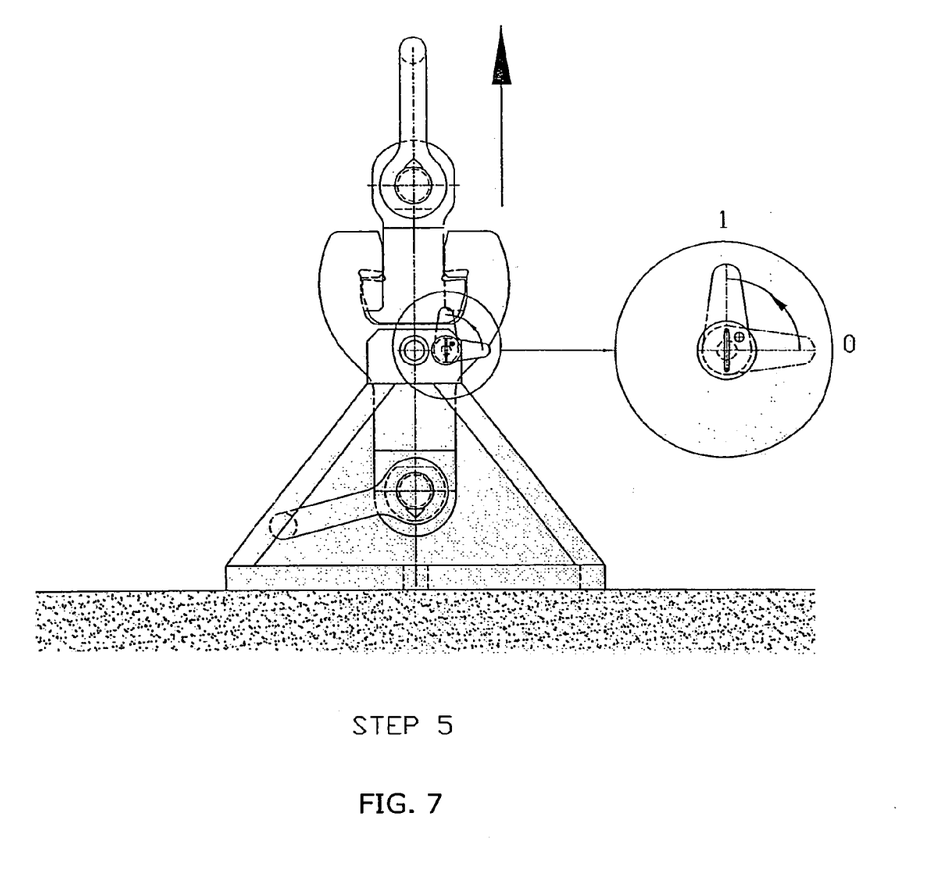
Figure 8:
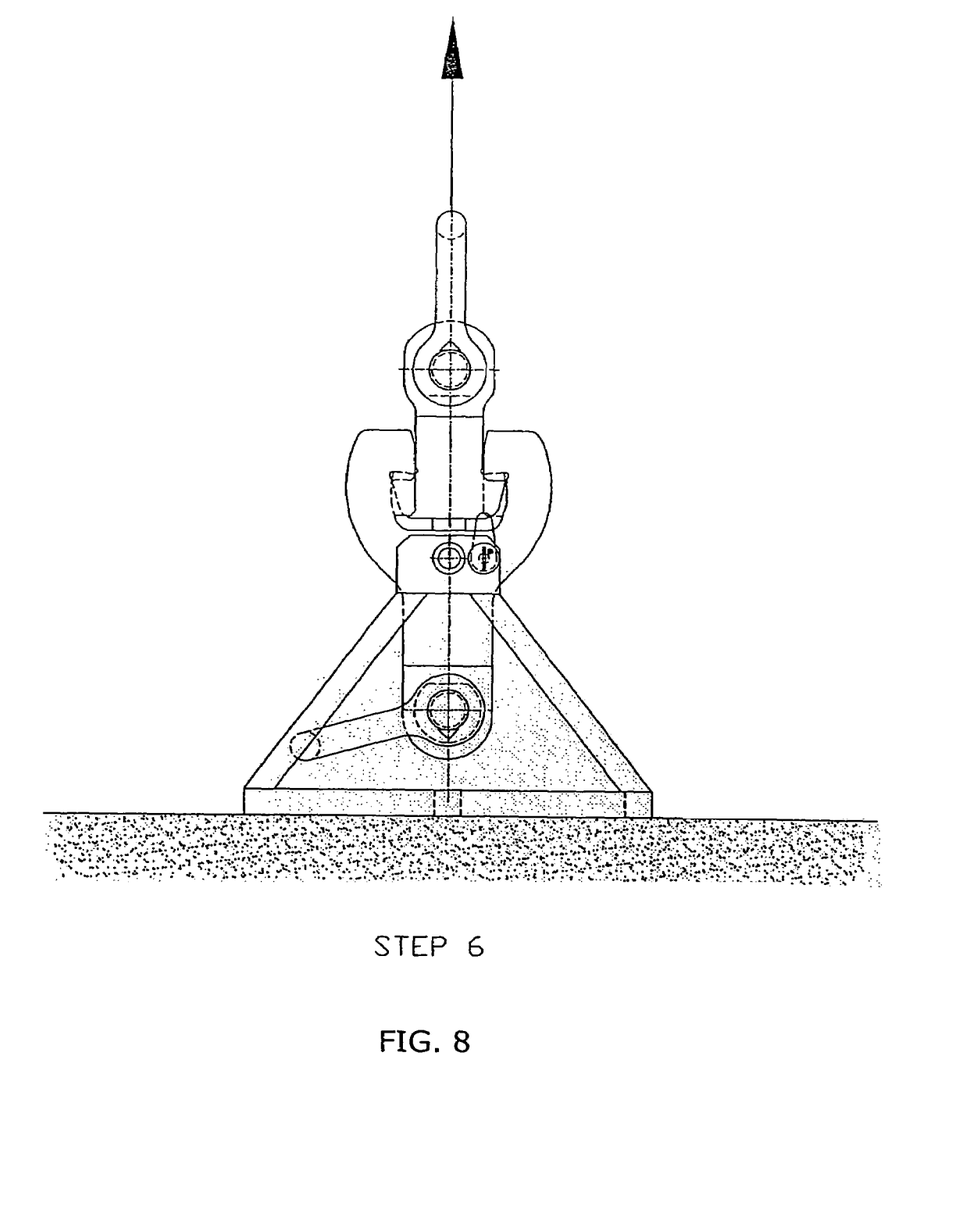
Figure 9:
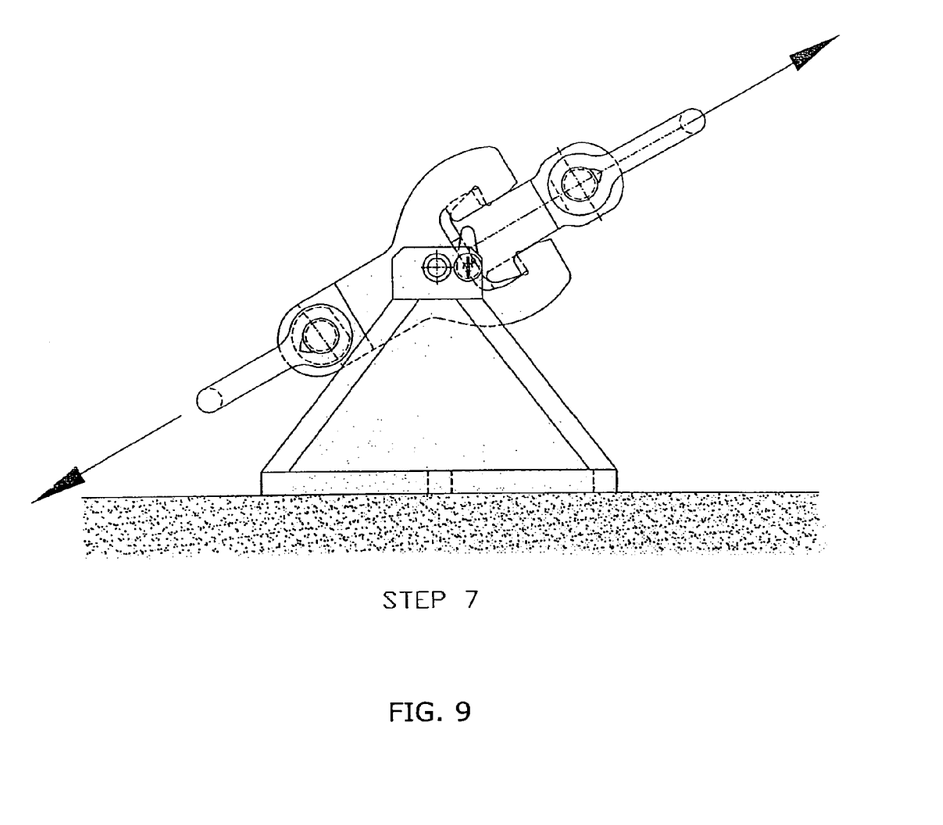

Referring now to FIG. 1a, and 1b, quick release, mooring line connector system parts are shown generally. 1 denotes a female bayonet part of the mooring line connector having a general cylindrical structure with an end flange 2, to which flange 2 a line connector 3 is applied. The female part has a substantially cylindrical recess 4 consisting of three different main parts, viz. a lower cylindrical part 5 having a substantially circular cross section and being elongated, i.e., having a longitudinally cylindrical extension, and an upper part 7 having a more complex cross section, namely a circular cross section provided with side wise arranged recesses 8 adapted to receive flanges of a male part 21, to be further explained and described below. Thus the female structure 1 will only show one axial opening, whereby it has an annular structure forming a load and force retrieving structure. At the lower end of the lower cylindrical part 5 there is an insert 9 into which different locks or receptor structures 10 can be applied. One object of the insert 9 with its receptor structure 10 is to allow for a control and guidance of male connector 21.

In the middle substantially cylindrical part 6 there are locking means 11 (FIGS. 2–9) arranged which is rotatably arranged around an axis and which can be operated from the outside by means of a mechanical device as such or a mechanical means driven by a subsea robot. The locking means may be controlled by manual operation or by a robot or remote operating vehicle (ROV) in order to prevent inadvertent disassembly of the mooring line connection assembly in the event the mooring line should become slack for any reason.

The cross sections of the different cylindrical parts 5, and 7 vary. Thus the cross section of the lower part is substantially circular, while the cross section of the upper part 7 is more complex. The diameters of the different cross sections vary as the lower part 5 has a small diameter, and the upper part 7 a diameter being larger than that of the lower part 5. The cross section of the upper part 7 as shown in FIG. 1a shows a substantially rectangular opening 13 with side flaps or wings 6 and recesses 8, which recesses 8 will allow admittance of the male part 21 into the cylindrical space of the lower part 5. The variation in diameter of the lower part 5 and the upper part 7 provides for the formation of a shoulder 14 to receive sidewise forces of a male part 21.

The male connector part 21 comprises an upper line connecting end flange 22 through which a shaft 23 is applied and to which shaft a line connector 24 having two ears fitting with the shaft is applied. To the line connector 24 a hook or similar lifting means can be connected, releasable or not. The line connector 24 is normally pivotably arranged. Below the end flange 22 there is a substantially cylindrical, massive part 25, which changes over to a middle part 26 partly showing flaps 27 being in substantial conformity with the recesses 8. The flaps 27 have second shoulders 28 being in substantial conformity with the first shoulders 14 of the female part. At the lower end 29 of the male part 21 there is a substantially cylindrical front end being in substantial conformity with the cylindrical lower part 5 of the female part 1. The very end of the lower end 29 may be provided with a key fitting into a receptor 10 of the lower cylindrical part 5.

In an alternative embodiment the front cylindrical parts 25, 26, and 27 comprises a steeply raising thread or drill helix 38 which facilitates in bringing the male connector in position in the female connector, when the female connector simultaneously contains a guiding means to fit in said raising thread. In this case there is a complementary locking means 39 placed above the insert means 9 for e.g., locking.

Connection/disconnection of the mooring line connector system will now be described. In a first step 0 there is a rack 51 placed sub sea in which rack 51 there is an opening into which the female part 1 of the system will fit. In step 1 the female connector 1 connected to a mooring line is placed in the rack 51 in any manner, the mooring line being not shown. In step 2 the male part 21 is lowered by means of the mooring line connected hereto towards the female part and is thereby controlled by a sub sea robot or a ROV (not shown). The male part 21 is thereby turned to fit into the recesses 8 of the female part with its flaps 27. In step 3 the lowering is continued in such a way that the lower end 29 enters the lower hollow cylindrical part 5. In step 4 the female and male parts are almost fitted whereby the male part is rotated 90° in relation to the female part, whereby the key 30 will fall into the receptor 10. Once any key falls into a receptor 10 the flaps 27 with its shoulders 28 will fit into the shoulders 14 of the upper female part 7. Once any key has fit into the receptor 10 the locking means 11 will be rotated to fit into locks (not shown) in the male part 21 (Step 7). The mooring line can then be stretched and the connected mooring lines can be whinshed away. It should be noted that the mooring line connector system of the present invention may be of other convenient configuration if desired, it being appropriate only that it have the capability of being quickly assembled and disassembled particularly in a remote environment such as the subsea environment and perhaps with the use of an ROV or other actuating mechanism for controlling relative movement of the male connector body and female structures for accomplishing quick connection or disconnection thereof.

Disconnection of mooring lines via the present anchoring device will be made using the reverse steps.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being defined by the accompanying claims.

The invention claimed is:

1. A mooring line connector system for connecting and disconnecting lines, comprising: a female connector body defining an internal receptacle and defining spaced male connector body surfaces defining an axially male connector receiving opening; the female connector having at least three substantially cylindrical subparts being integral with said connector body and a line connecting end; a male connector body having at least three substantially cylindrical subparts and a line connecting end; the female connector subparts being in substantial conformity with the male connector body subparts; the male connector body being rotatable in relation to the female connector body to bring shoulders present on each female and male body in contact, or out of contact, respectively, with each other.

2. The connector system according to claim 1, wherein said female connector body defines an axially male connector receiving opening having a partly circular cross section provided with recesses to receive a male connector body having partly a substantially cylindrical body provided with flaps and being conform with said male connecting receiving opening.

3. The connector mechanism of claim 1, wherein a lower part of said female connector body is provided with a receptor to receive a key present on a lower end of said male connector said receptor and key being provided to control an alignment of said female connector body and said male connector body.

4. The connector mechanism of claim 1, wherein said female connector body is provided with locking means to be brought in or out of locking position with a locking counter part present on the male connector body.

* * * * *